United States Patent Office 3,558,507
Patented Jan. 26, 1971

3,558,507
METHOD OF FORMING MINIATURE CAPSULES
Ludwig Harbort, Hannover, Germany, assignor to Gunther Wagner Pelikan-Werke, Hannover, Germany
No Drawing. Filed Apr. 4, 1967, Ser. No. 628,279
Claims priority, application Germany, Apr. 15, 1966,
W 41,358; May 20, 1966, W 41,622
Int. Cl. B01j *13/02;* B44d *1/02;* C09b *67/00*
U.S. Cl. 252—316                                          11 Claims

ABSTRACT OF THE DISCLOSURE

The invention is concerned with the formation of very tiny or miniature capsules which envelop liquid substances that may contain solids such as, for example, soot or pigments. In accordance with the invention, the capsules are formed from a dispersion system which contains a cellulose ester such as, for example, cellulose acetobutyrate, the liquid substance to be encapsulated, a medium, to wit, water, and an alkaline substance which reacts by saponification with the cellulose ester to form a film which is insoluble in the water and in the liquid material to be encapsulated.

According to a preferred embodiment, the cellulose ester is first dissolved in the liquid material to be encapsulated, while the alkaline substance, for example alkali metal hydroxide, is dissolved in the water. The material to be encapsulated which may, for example, be a dyestuff solution, enriched with the cellulose ester, is then introduced into the aqueous alkaline solution under stirring. If extremely tiny capsules are desired, the introduction of the material to be encapsulated, enriched with the cellulose ester, into the alkaline aqueous solution is accomplished by injecting the material to be encapsulated through an atomizing nozzle under relatively high pressure in the form of a fine spray.

The aqueous alkaline solution may contain a dispersion inducing agent in the form of an emulsifier or wetting material.

SUMMARY OF THE INVENTION

This invention generally relates to encapsulation and is particularly directed to a method of producing tiny or miniature capsules which envelop liquid substances. The term "capsule" as used herein is deemed to refer to an envelope of film material by which the liquid substance is completely encapsulated. The terms "liquid substance" or "liquid material" as used herein refer to liquids proper and also to liquids in which solid materials are present in dissolved and/or undissolved form.

Several procedures have previously been suggested for producing tiny capsules of the indicated kind. According to one of the prior art proposals, the capsules are produced pursuant to the principle of coacervation. Pursuant to a different suggestion, the capsule formation and the enveloping of solid and/or liquid substances is accomplished by polycondensation.

All the prior art procedures, however, have serious drawbacks, are cumbersome to carry out and render it difficult effectively to control the capsule formation, particularly as to size and thickness of the capsule wall.

Accordingly it is a primary object of this invention to provide a method of producing tiny capsules, which overcomes the prior art disadvantages and drawbacks and which results in the formation of capsules of the desired quality and size.

Another object of the invention is to provide a method of the indicated kind which is easy to carry out and control and which does not require elaborate equipment.

Extensive experiments and protracted research have indicated that the encapsulation of liquid substances can be accomplished in a particularly simple and reliable manner. The procedure on which the inventive process is based essentially resides in that the capsule formation takes place in a dispersion of the material to be encapsulated in a medium B, the material to be encapsulated containing one or several compounds A which react with a substance C contained in the medium B under the formation of a film which envelops the individual droplets or particles of the dispersion, the film being insoluble in the medium B and in the material to be encapsulated.

It has been ascertained that the procedure referred to is not solely responsible and determinative for the formation of very tiny capsules of the desired extremely small dimensions. It has rather been ascertained in the course of the research conducted that the nature of the substances and compounds employed significantly contributes to the size and characteristics of the capsules and thus constitutes an important factor in successfully carrying out the procedure. Accordingly, it is a further object of this invention to produce capsules according to the general procedure referred to which do not exceed a diameter of $100\mu$ and which in most instances have a diameter significantly below the upper limit referred to.

It has, moreover, been ascertained that the general procedure referred to results in capsules of a diameter of about 30 to $50\mu$, if the dispersion of the liquid substance or material to be encapsulated is agitated with ordinary agitation means or stirrers. However, for many purposes, such capsules, although relatively tiny, are still not small enough. Accordingly, further experiments have been conducted which have demonstrated that still smaller capsules are successfully obtained by atomizing the liquid material to be encapsulated and introducing it in this state into an aqueous alkaline solution, the atomization being accomplished by forcing the substance to be encapsulated through an atomizing nozzle under high pressure, the resulting fine spray entering the aqueous alkaline solution. In this manner, capsules of much lesser diameter are obtained as compared to capsules which are formed from a dispersion system which is merely stirred by an ordinary agitation means. This is clear from the following Examples IV to VI.

Briefly, and in accordance with this invention, the capsules are formed from a dispersion system which contains the liquid substance to be encapsulated, a medium in the form of water, an alkaline substance as, for example, alkali metal hydroxide, and a cellulose ester as, for example, cellulose acetobutyrate.

According to a preferred embodiment of the invention, the cellulose ester is first dissolved in the substance to be encapsulated while the alkali is dissolved in the medium, to wit, the water. The cellulose ester enriched liquid substance to be encapsulated is then added to the alkaline aqueous solution which latter preferably contains a dispersion inducing agent in the form of an emulsifier or wetting agent. The dispersion formation is preferably effected at elevated temperature and, as previously mentioned, if extremely tiny capsules are desired, the substance to be encapsulated and enriched with the cellulose ester is introduced into the aqueous alkaline solution through an atomizing nozzle and under relatively high pressure.

The invention will now be described by several examples, it being understood, however, that these examples are given by way of illustration and not by wdy of limitation and that many changes may be effected in process conditions in general without affecting in any way

EXAMPLE I

The purpose of this example is to encapsulate a 1% solution of Ceresblau GN (a trade name for a blue aniline dyestuff) in a mixture of 68 parts of cyclohexanone and 25 parts of diphenoxyethylformal. The encapsulation is effected as follows:

Compound A, to wit the cellulose ester, has first to be dissolved in the dyestuff solution to be encapsulated. Experience has demonstrated that excellent results are obtained if 6 parts by weight of the cellulose ester are dissolved in 94 parts by weight of dyestuff solution. The solution thus obtained is then heated to 70° C. 10 parts of the cellulose ester/dyestuff solution are then dispersed in 100 parts of a solution containing 10 parts of sodium hydroxide and 90 parts of water. The aqueous solution is also heated to 70° C. and contains 3–5 gram of Hostapon T, a trade name for a wetting agent and emulsifier. The dispersion is formed with the aid of a rapidly revolving agitator. In the course of a few minutes, the individual droplets of the dispersion are enveloped by films, the film formation being caused by the action of the strong alkali on the cellulose ester. After about 20–30 minutes, the entire amount of cellulose ester contained in the droplets has been converted into cellulose. The initially formed relatively thin-walled cellulose films are thus correspondingly reinforced and strengthened and envelop the individual droplets of the dyestuff solution in the form as stable capsules proper. The salts which have been formed as a result of the reaction between the strong alkali and the cellulose ester, as well as excess sodium hydroxide, are removed by washing with water, whereupon the capsules are ready for use.

In the above example, cellulose acetobutyrate is the cellulose ester, but other cellulose esters may also be used for the inventive capsule formation.

EXAMPLE II

The purpose of this example is to encapsulate acetophenon. The cellulose acetobutyrate of Example I is replaced by cellulose acetate. The alkali is again sodium hydroxide and the medium water. The experiment is carried out as follows:

A dispersion is formed by adding 10 parts by weight of a 5% solution of cellulose acetate in acetophenon of 80° C. temperature to 100 parts by weight of an aqueous sodium hydroxide solution of 10% concentration, the alkaline solution containing 5 parts by weight of Hostapon T, a well known wetting agent and emulsifier. The aqueous solution is also heated to 80° C. After vigorous agitation for 30–40 minutes, the acetophenon droplets are enveloped by capsules or films of cellulose. The further processing is performed as described in connection with Example I.

EXAMPLE III

The purpose of this example is the encapsulation of methyl nonylketone in which soot is distributed. In this example, the cellulose ester is cellulose propionate, the medium is water, while the alkali is sodium hydroxide.

The experiment is carried out as follows: An aqueous solution of sodium hydroxide of 10% concentration is prepared, the aqueous solution containing 5 parts by weight of Hostapon T as dispersion inducing agent. The solution is heated at 80° C. and 100 parts by weight of the solution are formed into dispersion with 10 parts by weight of a finely divided suspension of 1 part by weight of soot in 10 parts by weight of methyl nonylketone. The methyl nonylketone solution is heated to 80° C. and the dispersion is formed under vigorous stirring. After about 20–30 minutes, the droplets of soot/methyl nonylketone suspension are enveloped by closed capsule films of cellulose.

EXAMPLE IV

Each of Examples I, II and III were repeated but the liquid phase to be encapsulated and containing the cellulose ester was introduced into the aqueous alkali solution by forcing the liquid medium to be encapsulated through a nozzle of 0.1 mm. at an excess pressure of 10 atmospheres. Due to the fine or atomized spray entering the aqueous alkaline solution, extremely small capsules of 10–15$\mu$ diameter were obtained.

Similarly favorable results are obtained in the following examples:

EXAMPLE V

Liquid to be encapsulated: acetophenon.
Cellulose ester: cellulose acetate.
Medium: water.
Alkali: sodium hydroxide.

An aqueous sodium hydroxide solution of 10% concentration was prepared which contained 6 parts by weight of Hostapon (as in Example IV). The solution was heated to 70° C. and 10 parts by weight of a 12% solution of cellulose acetate in acetophenon was injected through a nozzle of 0.1 mm. opening at an excess pressure of 15 atmospheres into 100 parts by weight of the aqueous sodium hydroxide solution. The dispersion thus formed was stirred for 30 minutes, whereupon the entire cellulose acetate initially contained in the droplets had been converted into cellulose, which cellulose envelops the individual acetophenon droplets of the system in the form of stable capsules. The average diameter of the capsules thus obtained was 5–15$\mu$.

EXAMPLE VI

Liquid to be encapsulated: dispersion of soot in methyl nonylketone.
Cellulose ester: cellulose propionate.
Medium: water.
Alkali: sodium hydroxide.

An aqueous sodium hydroxide solution was prepared which contained 2 grams of sodium oleate as a dispersion inducing agent. The solution was heated to 70° C. 10 parts by weight of a suspension of 1 part by weight of soot in 100 parts by weight of a 6% solution of cellulose propionate in methyl nonylketone were heated to 70° C. and injected into 100 parts by weight of the sodium hydroxide solution through a nozzle of 0.1 mm. diameter and at an excess pressure of 20 atmospheres. After a few minutes, the droplets of the soot suspension in the methyl nonylketone were encapsulated by capsules of cellulose. The diameter of the capsules was on the average 5–10$\mu$.

Although several cellulose esters have been disclosed, it has been found that the capsule formation of the present invention can also successfully be performed with other cellulose esters of organic acids as, for example, cellulose phthalate. Further, the alkali need not be sodium hydroxide but other alkaline substances are suitable for the indicated purpose. Thus, for example, potassium hydroxide, lithium hydroxide, barium hydroxide, triethanolamine, tetraalkylammoniumhydroxide and others have been found to accomplish the same purpose.

The liquids to be encapsulated may, of course, vary, and generally all solvents or solvent mixtures for cellulose esters which are essentially immiscible with water are suitable for the inventive purpose.

In order to obtain suitable capsules, it is not absolutely necessary that the entire amount of cellulose ester contained in the droplets is converted into cellulose. The reaction between the alkaline substance and the cellulose ester can be interrupted before it has gone to completion. This can be effected by cooling and/or dilution of the dispersion with water. If such interruption is effected, then the wall thickness of the capsules does not reach the maximum value. From a practical point of view, however, the wall thickness of the capsules will be sufficient in order to envelop the dyestuff or the like solution which in that event still will contain small amounts of cellulose ester.

The capsules are thus more fragile but nevertheless are sufficiently strong to tightly encapsulate the substance in question.

For some purposes it may be of advantage if the solution to be encapsulated, to wit, for example, the dyestuff solution, contains still a certain amount of cellulose ester after the capsule formation has been completed. For example, the cellulose ester may thus cause a certain thickening of the encapsulated solution or, in the event that the substance to be encapsulated is a dyestuff solution containing a volatile solvent, the cellulose ester may act as film forming agent.

While specific embodiments of the invention have been shown and described in detail to illustrate the application of the inventive principles, it will be understood that the invention may be embodied otherwise without departing from such principles.

What is claimed is:

1. A method of forming tiny capsules, each capsule comprising an envelope of film material encapsulating a substance, which comprises preparing a dispersion system from
   (a) the substance to be encapsulated;
   (b) cellulose ester;
   (c) water; and
   (d) a water soluble alkaline substance capable of reacting by saponification with said cellulose ester to form a film of cellulose which is insoluble in said water and said substance whereby particles of substance (a) are encapsulated by the film thus formed.

2. A method as claimed in claim 1, wherein said substance is a liquid.

3. A method as claimed in claim 2, wherein said liquid contains solid material distributed in said liquid.

4. A method as claimed in claim 1, wherein said substance is a liquid, said cellulose ester first being dissolved in said substance and said water soluble alkaline substance first being dissolved in said water, whereupon said substance with the cellulose ester dissolved therein and said alkaline water are mixed to form the dispersion system.

5. A method as claimed in claim 1, wherein said system contains a dispersion inducing agent.

6. A method as claimed in claim 1, wherein said alkaline substance is alkali metal hydroxide, barium hydroxide, triethanolamine, or tetraalkylammoniumhydroxide.

7. A method as claimed in claim 1, wherein said cellulose ester is cellulose acetobutyrate, cellulose acetate, cellulose propionate or cellulosephthalate.

8. A method as claimed in claim 1, wherein the substance to be encapsulated is a liquid in which said cellulose ester is dissolved, said cellulose ester enriched substance being introduced in to the water in which the alkaline substance is dissolved under pressure in the form of a fine spray.

9. A method of forming tiny capsules, each capsule comprising an envelope of film material encapsulating a liquid substance, which comprises preparing an alkaline aqueous solution, the alkali of the solution being capable of reacting by saponification with cellulose ester to form a film and injecting into said solution through an atomizing nozzle and under pressure a fine spray of a liquid substance having dissolved therein a cellulose ester, whereby at least a portion of said cellulose ester and said alkali react to form film of cellulose envelopes around droplets of said liquid substance, said film envelopes being insoluble in water and in said substance.

10. A method as claimed in claim 9, wherein said spraying is effected at elevated temperature.

11. A method as claimed in claim 9, wherein said alkali is an alkali metal hydroxide.

References Cited

UNITED STATES PATENTS

| 2,088,642 | 8/1937 | Dreyfus | 260—230UX |
| 3,016,308 | 1/1962 | Macaulay | 252—316X |
| 3,429,827 | 2/1969 | Ruus | 252—316 |

RICHARD D. LOVERING, Primary Examiner

U.S. Cl. X.R.

8—79; 106—308; 117—100; 264—4; 424—35